US012809439B2

(12) United States Patent
Sivanandaswami et al.

(10) Patent No.: US 12,809,439 B2
(45) Date of Patent: Nov. 24, 2026

(54) SYSTEMS AND METHODS FOR POWER TOPOLOGY MAPPING

(71) Applicant: Dell Products L.P., Round Rock, TX (US)

(72) Inventors: Nikhil Sivanandaswami, Hyderabad (IN); Shivendra Katiyar, Bangalore (IN)

(73) Assignee: Dell Products L.P., Round Rock, TX (US)

(*) Notice: Subject to any disclaimer, the term of this patent is extended or adjusted under 35 U.S.C. 154(b) by 367 days.

(21) Appl. No.: 18/597,323

(22) Filed: Mar. 6, 2024

(65) Prior Publication Data

US 2025/0284328 A1 Sep. 11, 2025

(51) Int. Cl.

*G06F 1/3206* (2019.01)
*G06F 1/28* (2006.01)
*G06F 9/30* (2018.01)
*G05B 15/02* (2006.01)
*G06Q 50/06* (2024.01)

(52) U.S. Cl.

CPC .............. *G06F 1/28* (2013.01); *G06F 1/3206* (2013.01); *G06F 9/30036* (2013.01); *G05B 15/02* (2013.01); *G06Q 50/06* (2013.01)

(58) Field of Classification Search

CPC ...... G06F 1/28; G06F 1/3206; G06F 9/30036; G05B 15/02; G06Q 50/06

See application file for complete search history.

(56) References Cited

U.S. PATENT DOCUMENTS

2010/0005331 A1* 1/2010 Somasundaram ........ G06F 1/26 713/340
2011/0172937 A1* 7/2011 Quittek .................. G05B 15/02 702/60
2011/0270461 A1* 11/2011 Van Heuklon ...... G06F 11/3051 700/297
2012/0173177 A1* 7/2012 Nishiyama .............. H02J 13/14 702/62
2014/0164814 A1* 6/2014 Henise, IV ............... G06F 1/28 713/340
2016/0282823 A1* 9/2016 Wang ...................... G06Q 50/06
2021/0255684 A1* 8/2021 Lefurgy .............. H04L 43/0817
2025/0112463 A1* 4/2025 Mohajerani ............. H02J 3/007

* cited by examiner

*Primary Examiner* — Jonathan Michael Skrzycki
(74) *Attorney, Agent, or Firm* — Jackson Walker L.L.P.

(57) ABSTRACT

An information handling system may include a processor and a management agent configured to collect input power information and input voltage information associated with a plurality of power supply units, collect output power information and output voltage information associated with a plurality of outlets, and, for each outlet of the plurality of outlets, determine a power difference between such outlet and each of the plurality of power supply units and map such outlet to a power supply unit of the plurality of power supply units for which the power difference between such outlet and such power supply unit is smallest among all of the power differences between such outlet and each of the plurality of power supply units.

15 Claims, 5 Drawing Sheets

SYSTEMS AND METHODS FOR POWER TOPOLOGY MAPPING

TECHNICAL FIELD

The present disclosure relates in general to information handling systems, and more particularly to systems and methods for mapping power topology in a data center environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a data center comprising multiple information handling systems, there is often a desire to gather configuration and status information, and create maps from this information to define a complete power and information technology equipment infrastructure or topology of the data center. Having a map of such topology may assist in data center management, allowing removal of guess work in determining a data center's power needs, reclamation of trapped power, and avoiding unscheduled downtime.

Such configuration and status information may include at least two types of data. One type of data is data regarding individual information handling system hardware configuration, such as computing load and power consumption, etc., which may be used to optimize system resource mapping. Another type of data is a physical power mapping between one or more power distribution units and individual power supply units, which may be used for balancing loads on each alternating current phase in order to optimize power sourcing. Existing approaches to such mapping typically involve manual entry of mapping the server rack location and its corresponding power distribution unit and power distribution outlet in a table or other data structure. Such manual data entry may be costly, time consuming, and prone to error.

SUMMARY

In accordance with the teachings of the present disclosure, the disadvantages and problems associated with mapping of a power topology may be reduced or eliminated.

In accordance with embodiments of the present disclosure, an information handling system may include a processor and a management agent configured to collect input power information and input voltage information associated with a plurality of power supply units, collect output power information and output voltage information associated with a plurality of outlets, and, for each outlet of the plurality of outlets, determine a power difference between such outlet and each of the plurality of power supply units and map such outlet to a power supply unit of the plurality of power supply units for which the power difference between such outlet and such power supply unit is smallest among all of the power differences between such outlet and each of the plurality of power supply units.

In accordance with these and other embodiments of the present disclosure, a method may include collecting input power information and input voltage information associated with a plurality of power supply units, collecting output power information and output voltage information associated with a plurality of outlets, and for each outlet of the plurality of outlets, determining a power difference between such outlet and each of the plurality of power supply units, and mapping such outlet to a power supply unit of the plurality of power supply units for which the power difference between such outlet and such power supply unit is smallest among all of the power differences between such outlet and each of the plurality of power supply units.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: collect input power information and input voltage information associated with a plurality of power supply units; collect output power information and output voltage information associated with a plurality of outlets; and for each outlet of the plurality of outlets, determine a power difference between such outlet and each of the plurality of power supply units and map such outlet to a power supply unit of the plurality of power supply units for which the power difference between such outlet and such power supply unit is smallest among all of the power differences between such outlet and each of the plurality of power supply units.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
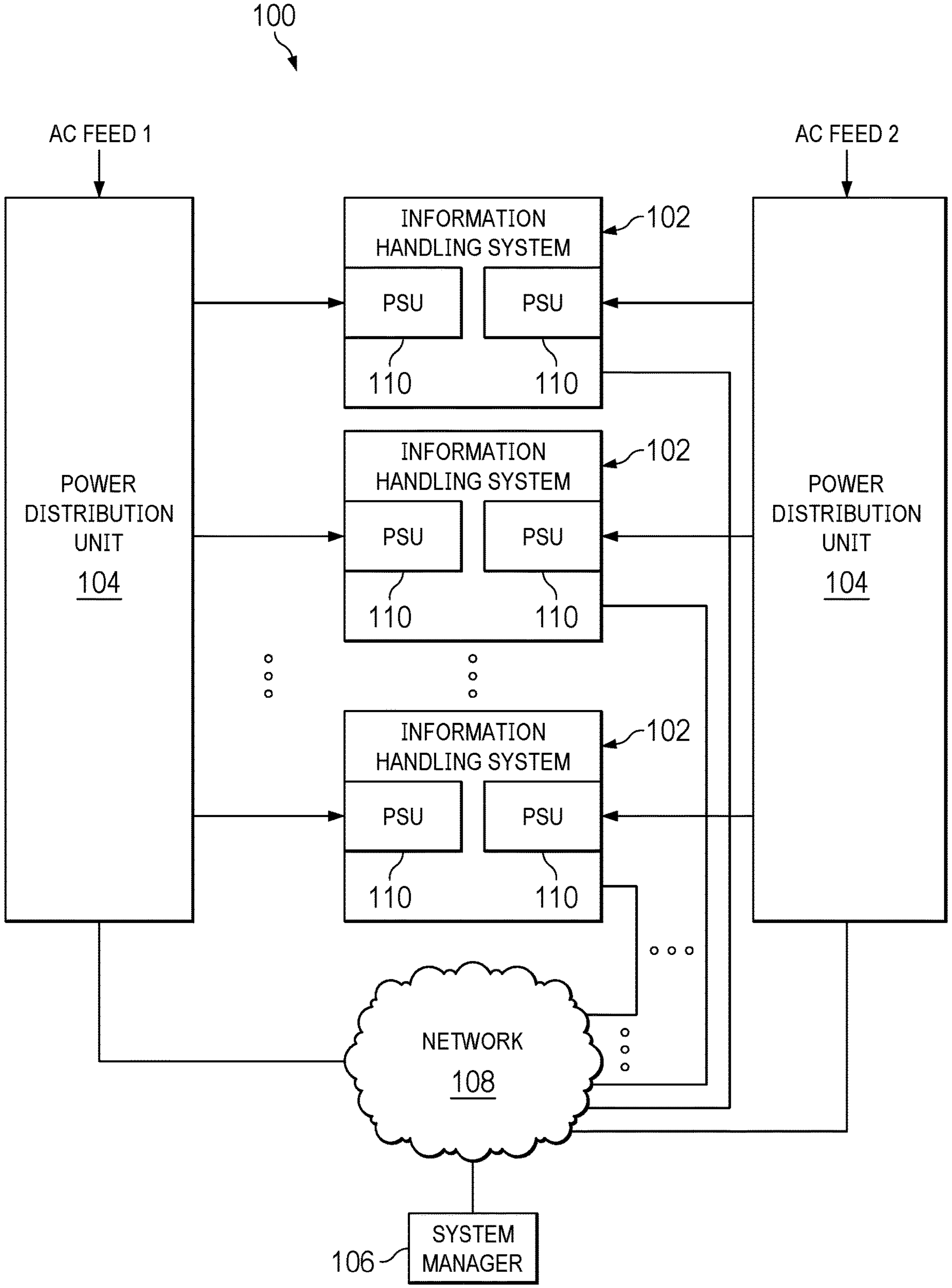
FIG. 1 illustrates a block diagram of an example system, in accordance with embodiments of the present disclosure.

FIG. 1 illustrates a block diagram of an example system 100 which may represent at least a portion of components present in a data center environment. As shown in FIG. 1, system 100 may comprise a plurality of information handling systems 102, one or more power distribution units 104, a system manager 106, and a network 108 communicatively coupled to the information handling systems 102, power distribution units 104, and system manager 106.

In some embodiments, each information handling system 102 may comprise a server. As shown in FIG. 1, each information handling system 102 may include at least one power supply unit (PSU) 110 configured to receive electrical energy from a corresponding power outlet of power distribution unit 104 in order to provide power to components of information handling system 102. Although FIG. 1 depicts each information handling system 102 having two PSUs 110, an information handling system 102 may include any suitable number of PSUs 110 each of which may be supplied electrical energy from a corresponding outlet of a power distribution unit 104.

Although FIG. 1 depicts system 100 having two power distribution units 104, system 100 may include any suitable number of power distribution units 104. In embodiments including a plurality of power distribution units 104, some power distribution units 104 may receive a different alternating current source as shown by "AC FEED 1" and "AC FEED 2" in FIG. 1.

Also as shown in FIG. 1, a system manager 106 for monitoring, control, and management of power distribution units 104 and information handling systems 102 may be coupled via network 108 to power distribution units 104 and information handling systems 102 (e.g., via Ethernet).

Network 108 may be a network and/or fabric configured to couple system manager 106 to information handling systems 102, power distribution units 104, and/or one or more other information handling systems. In these and other embodiments, network 108 may include a communication infrastructure, which provides physical connections, and a management layer, which organizes the physical connections and information handling systems communicatively coupled to network 108. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, software, or any combination thereof.

Figure 2:
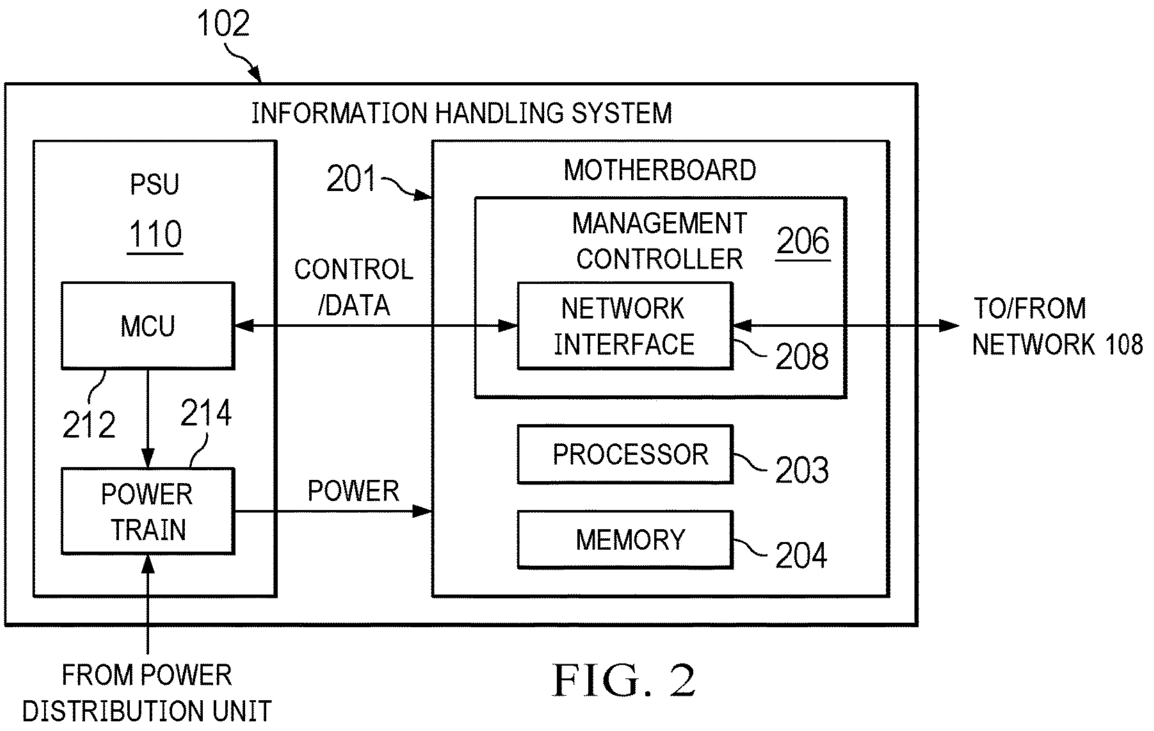
FIG. 2 illustrates a block diagram of an example information handling system, in accordance with embodiments of the present disclosure.

FIG. 2 illustrates a block diagram of an example of an information handling system 102. As depicted, information handling system 102 may include PSU 110, a motherboard 201, and one or more other information handling resources.

Motherboard 201 may include a circuit board configured to provide structural support for one or more information handling resources of information handling system 102 and/or electrically couple one or more of such information handling resources to each other and/or to other electric or electronic components external to information handling system 102. As shown in FIG. 2, motherboard 201 may include a processor 203, memory 204, a management controller 206, and one or more other information handling resources.

Processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204 and/or another component of information handling system 102.

Memory 204 may be communicatively coupled to processor 203 and may comprise any system, device, or apparatus operable to retain program instructions or data for a period of time. Memory 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 206 may be configured to provide out-of-band management facilities for management of information handling system 102. Such management may be made by management controller 206 even if information handling system 102 is powered off or powered to a standby state. Management controller 206 may include a processor, memory, out-of-band network interface 208 separate from and physically isolated from an in-band network interface of information handling system 102, and/or other embedded information handling resources. In certain embodiments, management controller 206 may include or may be an integral part of a baseboard management controller (BMC) or a remote access controller (e.g., a Dell Remote Access Controller or Integrated Dell Remote Access Controller). In other embodiments, management controller 206 may include or may be an integral part of a chassis management controller (CMC). In some embodiments, management controller 206 may be configured to communicate with PSU 110 to communicate control and/or telemetry data between the two.

Network interface 208 may comprise any suitable system, apparatus, or device operable to serve as an interface between management controller 206 and another information handling system (e.g., system manager 106) and/or a network (e.g., network 108). Network interface 208 may enable management controller 206 to communicate using any suitable transmission protocol and/or standard. In some embodiments, network interface 206 may be configured to communicate with other information handling systems via one or more protocols or standards discussed above with respect to network 108. In these and other embodiments, network interface 208 may comprise a network interface card, or "NIC."

Generally speaking, PSU 110 may include any system, device, or apparatus configured to supply electrical current to one or more information handling resources of information handling system 102. As shown in FIG. 2, PSU 110 may include one or more microcontroller units (MCUs) 212 and a power train 214.

An MCU 212 may comprise a microprocessor, DSP, ASIC, FPGA, EEPROM, or any combination thereof, or any other device, system, or apparatus for controlling operation of its associated PSU 110. As such, an MCU 212 may comprise firmware, logic, and/or data for controlling functionality of such PSU 110. In some embodiments, MCU 212 may also be configured to meter one or more parameters (e.g., voltage, current, input power, etc.) indicative of electrical energy received by power train 214 from a power distribution unit 104. In some embodiments, MCU 212 may be configured to communicate such metered information to system manager 106 via management controller 206 and network interface 208.

Power train 214 may include any suitable system, device, or apparatus for converting electrical energy received from power distribution unit 104 (e.g., a 120-volt alternating current voltage waveform) into electrical energy usable to information handling resources of information handling system 102 (e.g., 12-volt direct current voltage source). Selected components of an example power train 214 are shown in FIG. 3 below.

In addition to motherboard 201, processor 203, memory 204, management controller 206, network interface 208, and PSU 110, information handling system 102 may include one or more other information handling resources.

Figure 3:
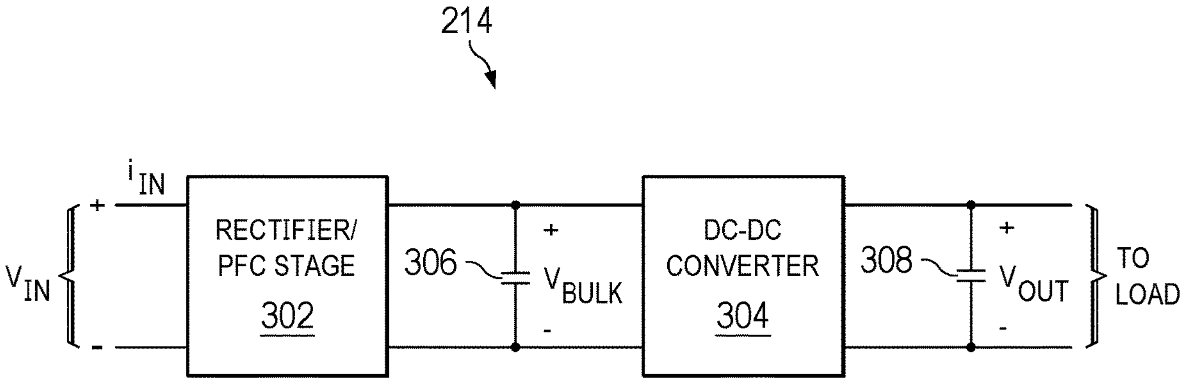
FIG. 3 illustrates a block diagram of an example power train, in accordance with embodiments of the present disclosure.

FIG. 3 illustrates a block diagram of an example power train 214, in accordance with embodiments of the present disclosure. As shown in FIG. 3, power train 214 may include two converter stages: a rectifier/power factor correction (PFC) stage 302, a DC/DC converter stage 304, a bulk capacitor 306 coupled between an output of rectifier/PFC stage 302 and an input of DC/DC converter stage 304 and an output capacitor 308 coupled to an output of DC/DC converter stage 304.

Rectifier/PFC stage 302 may be configured to, based on an input current $i_{IN}$, a sinusoidal voltage source $v_{IN}$, and a bulk capacitor voltage $V_{BULK}$, shape the input current $i_{IN}$ to have a sinusoidal waveform in-phase with the source voltage $v_{IN}$ and to generate regulated DC bus voltage $V_{BULK}$ on bulk capacitor 306.

DC/DC converter stage 304 may convert bulk capacitor voltage $V_{BULK}$ to a DC output voltage $V_{OUT}$ on output capacitor 308 which may be provided to a load (e.g., to information handling resources of information handling system 102 in order to power such information handling resources). In some embodiments, DC/DC converter stage 304 may be implemented as a converter which converts a higher DC voltage (e.g., 400 V) into a lower DC voltage (e.g., 12 V).

Figure 4:
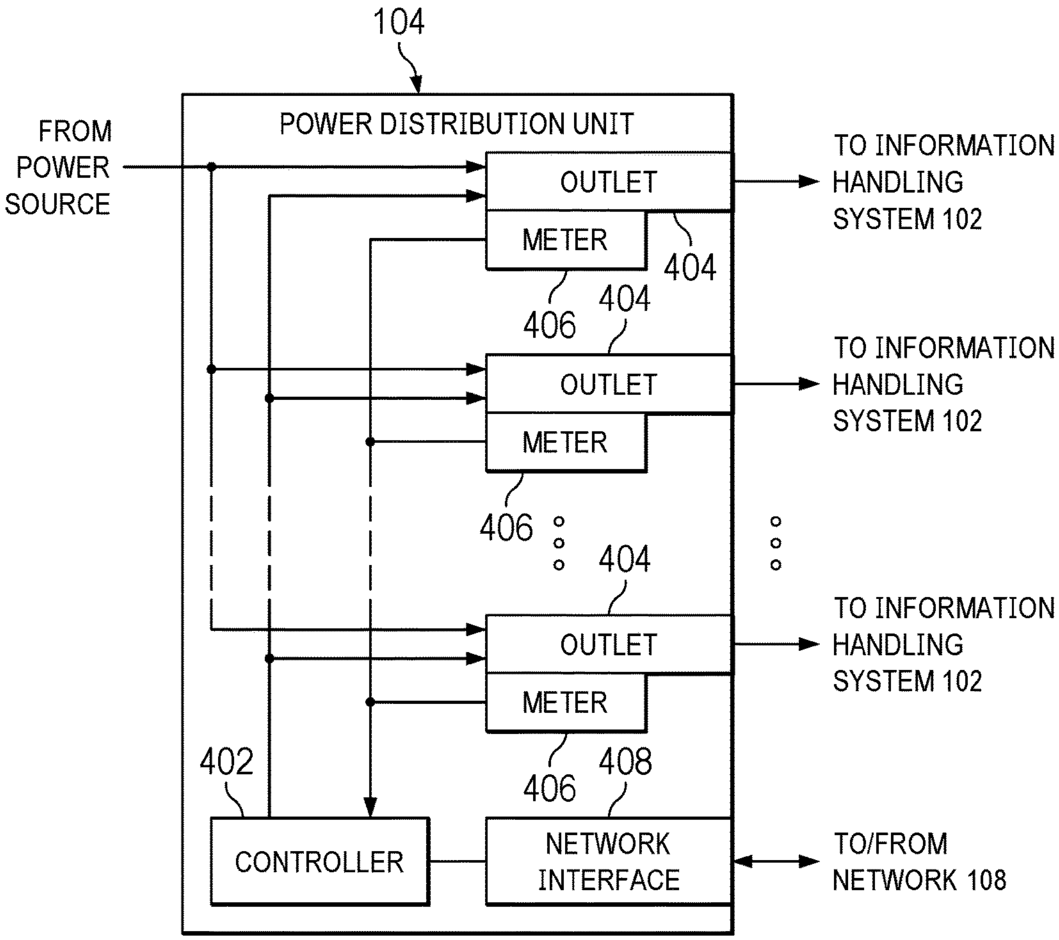
FIG. 4 illustrates a block diagram of an example power distribution unit, in accordance with embodiments of the present disclosure.

FIG. 4 illustrates a block diagram of an example power distribution unit 104, in accordance with embodiments of the present disclosure. As shown in FIG. 4, power distribution unit 104 may be an "intelligent" power distribution unit 104 comprising a controller 402, a plurality of outlets 404, a plurality of meters 406, and a network interface 408.

Controller 402 may comprise any system, device, or apparatus operable to monitor and/or control operation of power distribution unit 104, including control of operation of outlets 404 and the distribution of power thereto, and the reading and/or processing of information from meters 406. Controller 402 may include, without limitation a microprocessor, microcontroller, digital signal processor (DSP), application specific integrated circuit (ASIC), or any other digital or analog circuitry configured to interpret and/or execute program instructions and/or process data. In some embodiments, controller 402 may interpret and/or execute program instructions (e.g., firmware) and/or process data stored in computer-readable media accessible to controller 402.

In operation, power distribution unit 104 may distribute electrical energy received from a power source (e.g., a nominally 60 Hz/110 V line voltage in the United States of America or a nominally 50 Hz/220 V line voltage in Europe) to one or more outlets 404. Each outlet 404 may comprise a suitable electrical connector (e.g., a female electrical connector) for receiving a plug or other male connector of a device (e.g., a PSU 110 of an information handling system 102) in order to deliver electrical energy to such device.

Each meter 406 may be associated with a corresponding outlet 404 (e.g., in a one-to-one correspondence) and may include any system, device, or apparatus configured to meter one or more parameters (e.g., voltage, current, output power, etc.) indicative of electrical energy delivered from the corresponding outlet 404. In some embodiments, a meter 406 may be configured to communicate such metering information to system manager 106 via controller 402 and network interface 408.

Network interface 408 may comprise any suitable system, apparatus, or device operable to serve as an interface between power distribution unit 104 and an information handling system (e.g., system manager 106) and/or a network (e.g., network 108). Network interface 408 may enable power distribution unit 104 to communicate using any suitable transmission protocol and/or standard. In some embodiments, power distribution unit 104 may be configured to communicate with other information handling systems (including, without limitation, system manager 106) via one or more protocols or standards discussed above with respect to network 108. In these and other embodiments, network interface 408 may comprise a NIC.

Figure 5:
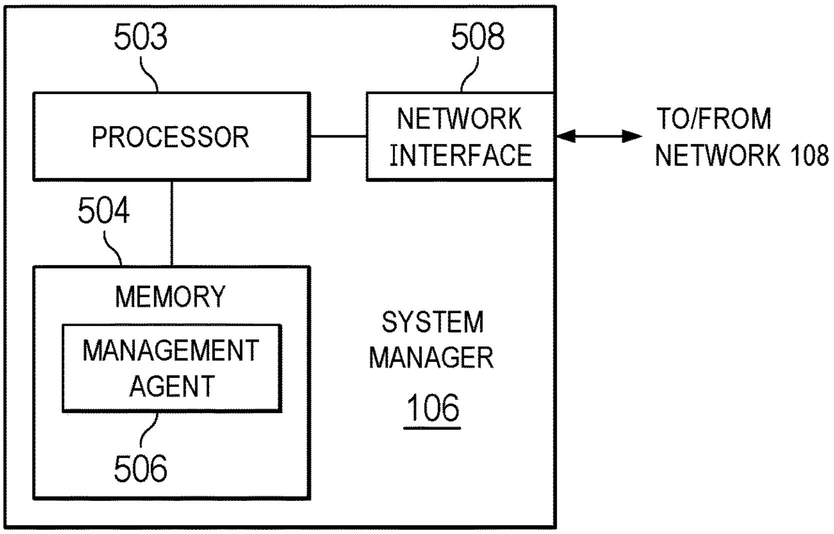
FIG. 5 illustrates a block diagram of an example system manager, in accordance with embodiments of the present disclosure.

FIG. 5 illustrates a block diagram of an example system manager 106, in accordance with embodiments of the present disclosure. As described above, system manager 106 may be configured to monitor, control, and manage power distribution unit 104 and information handling systems 102. In some embodiments, system manager 106 may comprise a "top or rack" switch for a server rack comprising information handling systems 102. In other embodiments, system manager 106 may comprise a personal computer, such as a laptop, notebook, or desktop computer. In yet other embodiments, system manager 106 may be a mobile device sized and shaped to be readily transported and carried on a person of a user of information handling system 102 (e.g., a smart phone, a tablet computing device, a handheld computing device, a personal digital assistant, etc.). As shown in FIG. 5, system manager 106 may comprise a processor 503, a memory 504, and a network interface 508.

Processor 503 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 503 may interpret and/or execute program instructions and/or process data stored in memory 504 and/or another component of system manager 106.

Memory 504 may be communicatively coupled to processor 503 and may comprise any system, device, or apparatus operable to retain program instructions or data for a period of time. Memory 504 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to system manager 106 is turned off. As shown in FIG. 5, memory 504 may have stored thereon a management agent 506. Management agent 506 may include a program of instructions that may be read and executed by processor 503 in order to carry out the management functionality of system manager 106, as such functionality is described elsewhere in this disclosure.

Network interface 508 may comprise any suitable system, apparatus, or device operable to serve as an interface between system manager 106 and one or more information handling systems (e.g., information handling systems 102), other networked devices (e.g., power distribution unit 104) and/or a network (e.g., network 108). Network interface 508 may enable system manager 106 to communicate using any suitable transmission protocol and/or standard. In some embodiments, system manager 106 may be configured to communicate with other information handling systems via one or more protocols or standards discussed above with respect to network 108. In these and other embodiments, network interface 508 may comprise a NIC.

In operation, management agent 506 may group or "zone" information handling systems 102 together as a set. For example, management agent 506 may group information handling systems 102 together which are coupled to the same top of rack switch, for example by using an Internet Protocol address table (e.g., stored in memory 504 of system manager 106 or a top of rack switch) which may indicate those information handling systems located in the same server rack. Information handling systems 102 coupled to the same top of rack switch are likely to be powered from the same set of power distribution units 104.

After zoning information handling systems 102 likely to be powered from the same set of power distribution units 104, management agent 506 may automatically map individual outlets 404 of power distribution units 104 to the respective individual PSUs 110 coupled with (i.e., plugged into) such outlets 404. To perform such automatic mapping, management agent 506 may sample instantaneous input power and voltage metrics from all PSUs 110 and sample instantaneous output power and voltage metrics from all outlets 404 for a defined period of time (e.g., every 10 seconds for two minutes). In some embodiments, management agent 506 may discard from the mapping process outlets 404 and PSUs 110 that report zero readings for voltage and/or power. Management agent 506 may further group PSUs 110 and outlets 404 having similar voltage values together. In addition, management agent 506 may for each outlet 404, determine a power difference between the output power of such outlet 404 and the input power of every PSU 110. Further, management agent 506 may map each outlet 404 to the PSU 110 having, out of all of the PSUs 110, the smallest power difference between the output power of such outlet 404 and the input power of such PSU 110.

After mapping each outlet 404 to a respective PSU 110, management agent 506 may verify the mappings. To perform such verification for a mapping of a particular PSU 110 of one information handling system 102 to a particular outlet 404, management agent 506 may cause all other information handling systems 102 except for the particular information handling system 102 to be power capped. Management agent 506 may then cause power consumption on the particular information handling system 102 to momentarily change and determine if a meter 406 associated with the outlet 404 mapped to the information handling system 102 reports a similar change in power delivery. If the change in power delivery at the outlet 404 is similar to the change in power consumption at the information handling system 102, then the mapping is verified. Such verification process may be repeated for each mapping of outlets 404 to PSUs 110.

Figure 6:
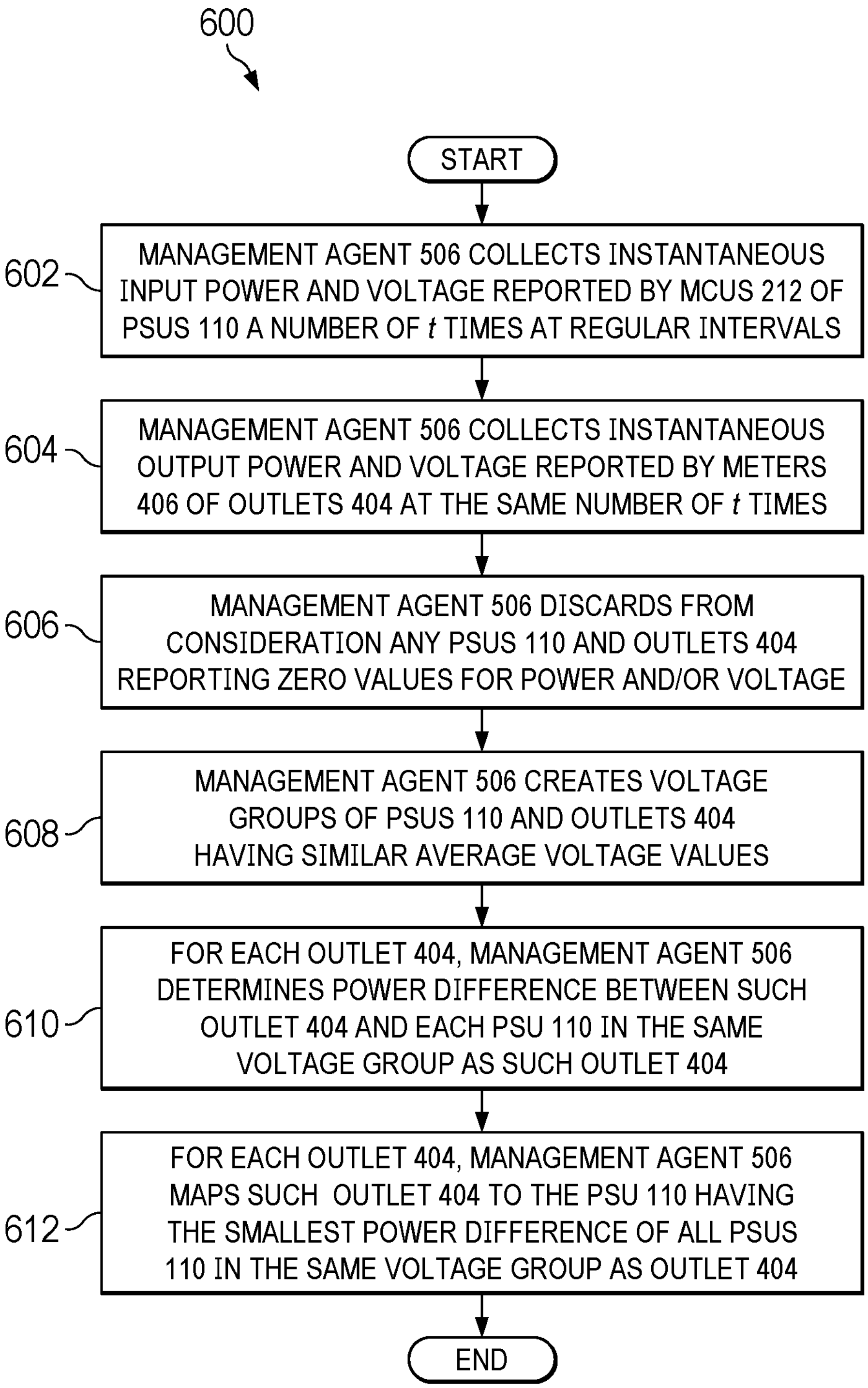
FIG. 6 illustrates a flow chart of an example method for mapping a power supply unit to a power distribution unit and outlet, in accordance with embodiments of the present disclosure.

FIG. 6 illustrates a flow chart of an example method 600 for mapping PSUs 110 to power distribution units 104 and outlets 404 thereof, in accordance with embodiments of the present disclosure. According to certain embodiments, method 600 may begin at step 602. As noted above, teachings of the present disclosure may be implemented in a variety of configurations of system 100. As such, the preferred initialization point for method 600 and the order of the steps comprising method 600 may depend on the implementation chosen.

At step 602, management agent 506 may collect instantaneous input power and voltage reported by MCUs 212 of PSUs 110 a number of t times at regular intervals. A variable $$IP_t^n$$

may define an input power of a PSU $PSU_N$ at a time instant t, and a variable $$IV_t^n$$

may define an input voltage of such PSU $PSU_N$ at time instant t.

At step 604, management agent 506 may collect instantaneous output power and voltage reported by meters 406 of outlets 404 at the same number of t times. A variable $$OP_t^n$$

may define an output power of an outlet $PDUoutlet_N$ at time instant t, and a variable $$OV_t^n$$

may define an output voltage of such outlet $PDUoutlet_N$ at time instant t.

At step 606, management agent 506 may discard from consideration any PSUs 110 and outlets 404 reporting zero values for power and/or voltage.

At step 608, management agent 506 may create voltage groups of PSUs 110 and outlets 404 having similar average voltage values. For example, in some embodiments, management agent 506 may use K-means clustering to determine average voltages, for example:

$$\text{Average input voltage of } PSU_i = \frac{\sum_{k=1}^{n} IV_k^i}{t}; \text{ and}$$

-continued $$\text{Average output voltage of } PDUoutlet_j = \frac{\sum_{k=1}^{n} OV_k^j}{t}.$$

At step 610, for each outlet 404, management agent 506 may determine a power difference between such outlet 404 and each PSU 110 in the same voltage group as such outlet 404 as determined at step 608. For example, in some embodiments, such power difference may be calculated as a power difference "distance" $D_{i,j}$ based on the power vectors collected at step 604, as given by:

$$D_{i,j} = \sum_{k=1}^{n} \left| IP_k^i - OP_k^j \right|$$

At step 612, for each outlet 404, management agent 506 may map such outlet 404 to the PSU 110 having the smallest power difference (e.g., smallest power difference distance) of all PSUs 110 in the same voltage group as outlet 404.

At the conclusion of step 612, method 600 may end.

Method 600 may be implemented using m 100, components thereof or any other system operable to implement method 600. In certain embodiments, method 600 may be implemented partially or fully in software and/or firmware embodied in computer-readable media.

Figure 7:
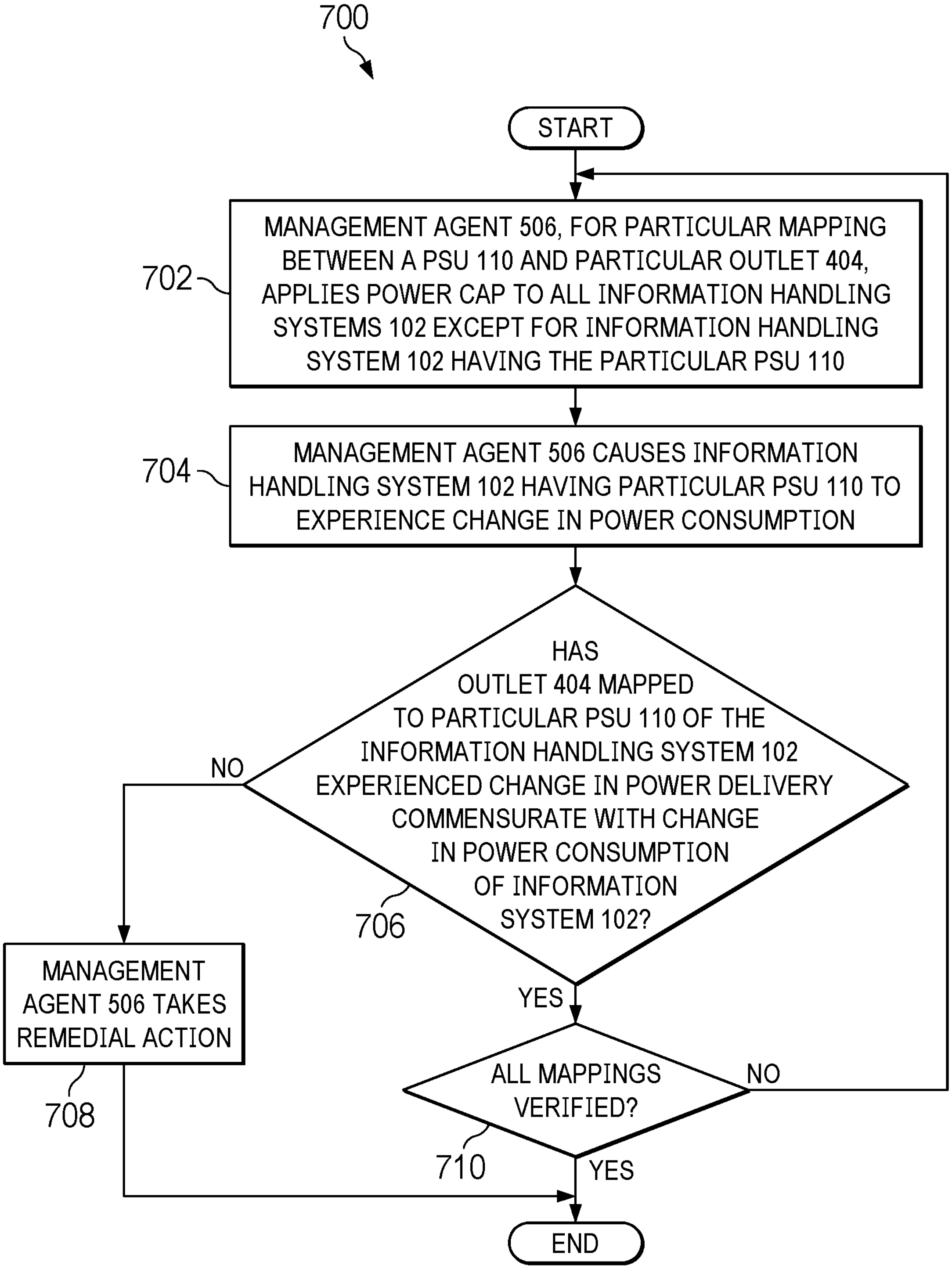
FIG. 7 illustrates a flow chart of an example method for verifying a mapping of a power supply unit to a power distribution unit and outlet, in accordance with embodiments of the present disclosure.

FIG. 7 illustrates a flow chart of an example method 700 for verification of mapping of PSUs 110 to power distribution units 104 and outlets 404 thereof, in accordance with embodiments of the present disclosure. According to certain embodiments, method 700 may begin at step 702. As noted above, teachings of the present disclosure may be implemented in a variety of configurations of system 100. As such, the preferred initialization point for method 700 and the order of the steps comprising method 700 may depend on the implementation chosen.

At step 702, management agent 506 may, for a particular mapping between a PSU 110 and a particular outlet 404 (e.g., as determined by execution of method 600), apply a power cap to all information handling systems 102 except for the information handling system 102 having the particular PSU 110.

At step 704, management agent 506 may cause the information handling system 102 having the particular PSU 110 to experience a change in power consumption. For example, in some embodiments, when management agent 506 has host access to the information handling system 102 having the particular PSU 110, management agent 506 may cause a processor on the information handling system 102 to execute a predefined workload. As another example, when management agent 506 lacks host access to the information handling system 102 having the particular PSU 110, management agent 506 may (e.g., via management controller 206 of the information handling system 102) cause an increase in power consumption by increasing a fan speed within information handling system 102.

At step 706, management agent 506 may determine if the outlet 404 mapped to the particular PSU 110 of the information handling system 102 has experienced a change in power delivery commensurate with the change in power consumption of the information handling system 102. If the outlet 404 experiences a change in power delivery commensurate with the change in power consumption of the information handling system 102, method 700 may proceed to step 710. Otherwise, method 700 may proceed to step 708.

At step 708, responsive to the outlet 404 failing to experience a change in power delivery commensurate with the change in power consumption of the information handling system 102, management agent 506 may take a remedial action. Such remedial action may include any suitable action including without limitation communicating an alert (e.g., to a user) regarding the incorrect mapping and/or repeating method 600 to re-map outlets 404 to PSUs 110. After completion of step 708, method 700 may end.

At step 710, management agent 506 may determine if all mappings of outlets 404 to PSUs 110 have been verified. If all PSUs 110 have been so verified, method 700 may end. Otherwise, method 700 may proceed again to step 702, and steps 702 through 706 may repeat for each mapping. After completion of step 710, method 700 may end.

Although FIG. 7 discloses a particular number of steps to be taken with respect to method 700, method 700 may be executed with greater or fewer steps than those depicted in FIG. 7. In addition, although FIG. 7 discloses a certain order of steps to be taken with respect to method 700, the steps comprising method 700 may be completed in any suitable order.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a processor; and a management agent configured to:

collect, at a plurality of different times, input power information and input voltage information associated with a plurality of power supply units;

collect, at the plurality of different times, output power information and output voltage information associated with a plurality of outlets; and for each outlet of the plurality of outlets:

determine a power difference between such outlet and each of the plurality of power supply units;

map such outlet to a power supply unit of the plurality of power supply units for which the power difference between such outlet and such power supply unit is smallest among all of the power differences between such outlet and each of the plurality of power supply units; and verify a mapping between a particular power supply unit of the plurality of power supply units and a particular outlet of the plurality of outlets by causing a change in power consumption of a system comprising the particular power supply unit and detecting if a commensurate change occurs in power delivery of the particular outlet.

2. The information handling system of claim 1, wherein the management agent is further configured to, based on the input voltage information and the output voltage information, select the plurality of power supply units from a larger plurality of power supply units and select the plurality of outlets from a larger plurality of outlets such that each of the plurality of power supply units selected has an input voltage approximately equal to that of each of the plurality of outlets selected.

3. The information handling system of claim 1, wherein:

the input power information associated with the plurality of power supply units comprises, for each power supply unit of the plurality of power supply units, an input power vector defining an amount of input power of such power supply unit at a plurality of different times; and the output power information associated with the plurality of outlets comprises, for each outlet of the plurality of outlets, an output power vector defining an amount of output power of such outlet at the plurality of different times.

4. The information handling system of claim 3, wherein determining the power difference between a particular outlet of the plurality of outlets and each of the plurality of power supply units comprises determining a vector difference distance between the particular outlet and each of the plurality of power supply units.

5. The information handling system of claim 4, the management agent further configured to map the particular outlet to a respective power supply unit of the plurality of power supply units for which the vector difference distance between such outlet and such power supply unit is smallest among all of the vector difference distances between such outlet and each of the plurality of power supply units.

6. A method comprising:

collecting, at a plurality of different times, input power information and input voltage information associated with a plurality of power supply units;

collecting, at the plurality of different times, output power information and output voltage information associated with a plurality of outlets; and for each outlet of the plurality of outlets:

determining a power difference between such outlet and each of the plurality of power supply units;

mapping such outlet to a power supply unit of the plurality of power supply units for which the power difference between such outlet and such power supply unit is smallest among all of the power differences between such outlet and each of the plurality of power supply units; and verifying a mapping between a particular power supply unit of the plurality of power supply units and a particular outlet of the plurality of outlets by causing a change in power consumption of a system comprising the particular power supply unit and detecting if a commensurate change occurs in power delivery of the particular outlet.

7. The method of claim 6, further comprising, based on the input voltage information and the output voltage information, selecting the plurality of power supply units from a larger plurality of power supply units and selecting the plurality of outlets from a larger plurality of outlets such that each of the plurality of power supply units selected has an input voltage approximately equal to that of each of the plurality of outlets selected.

8. The method of claim 6, wherein:

the input power information associated with the plurality of power supply units comprises, for each power supply unit of the plurality of power supply units, an input power vector defining an amount of input power of such power supply unit at a plurality of different times; and the output power information associated with the plurality of outlets comprises, for each outlet of the plurality of outlets, an output power vector defining an amount of output power of such outlet at the plurality of different times.

9. The method of claim 8, wherein determining the power difference between a particular outlet of the plurality of outlets and each of the plurality of power supply units comprises determining a vector difference distance between the particular outlet and each of the plurality of power supply units.

10. The method of claim 9, further comprising mapping the particular outlet to a respective power supply unit of the plurality of power supply units for which the vector difference distance between such outlet and such power supply unit is smallest among all of the vector difference distances between such outlet and each of the plurality of power supply units.

11. An article of manufacture comprising:

a non-transitory computer-readable medium; and computer-executable instructions carried on the computer-readable medium, the instructions readable by a processor, the instructions, when read and executed, for causing the processor to:

collect, at a plurality of different times, input power information and input voltage information associated with a plurality of power supply units;

collect, at the plurality of different times, output power information and output voltage information associated with a plurality of outlets; and for each outlet of the plurality of outlets:

determine a power difference between such outlet and each of the plurality of power supply units;

map such outlet to a power supply unit of the plurality of power supply units for which the power difference between such outlet and such power supply unit is smallest among all of the power differences between such outlet and each of the plurality of power supply units; and verify a mapping between a particular power supply unit of the plurality of power supply units and a particular outlet of the plurality of outlets by causing a change in power consumption of a system comprising the particular power supply unit and detecting if a commensurate change occurs in power delivery of the particular outlet.

12. The article of claim 11, the instructions for further causing the processor to, based on the input voltage information and the output voltage information, select the plurality of power supply units from a larger plurality of power supply units and select the plurality of outlets from a larger plurality of outlets such that each of the plurality of power supply units selected has an input voltage approximately equal to that of each of the plurality of outlets selected.

13. The article of claim 11, wherein:

the input power information associated with the plurality of power supply units comprises, for each power supply unit of the plurality of power supply units, an input power vector defining an amount of input power of such power supply unit at a plurality of different times; and the output power information associated with the plurality of outlets comprises, for each outlet of the plurality of outlets, an output power vector defining an amount of output power of such outlet at the plurality of different times.

14. The article of claim 13, wherein determining the power difference between a particular outlet of the plurality of outlets and each of the plurality of power supply units comprises determining a vector difference distance between the particular outlet and each of the plurality of power supply units.

15. The article of claim 14, the instruction for further causing the processor to map the particular outlet to a respective power supply unit of the plurality of power supply units for which the vector difference distance between such outlet and such power supply unit is smallest among all of the vector difference distances between such outlet and each of the plurality of power supply units.

* * * * *